Sept. 21, 1943.   R. K. JEFFREY   2,329,838
BRAKING SYSTEM
Original Filed Aug. 4, 1939   3 Sheets-Sheet 1
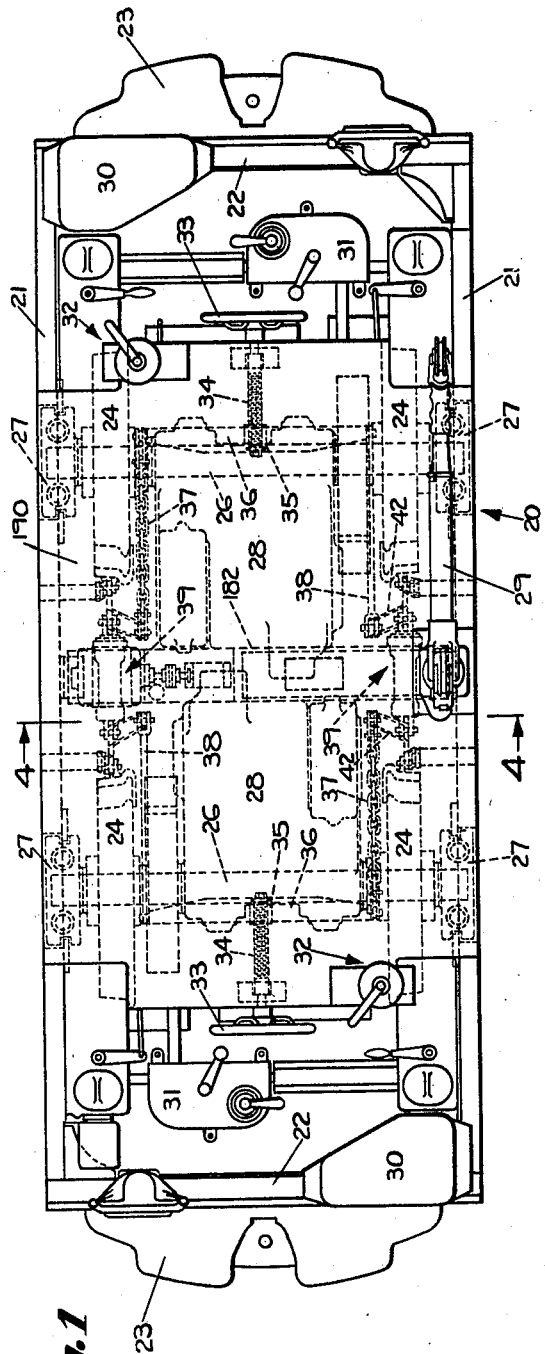
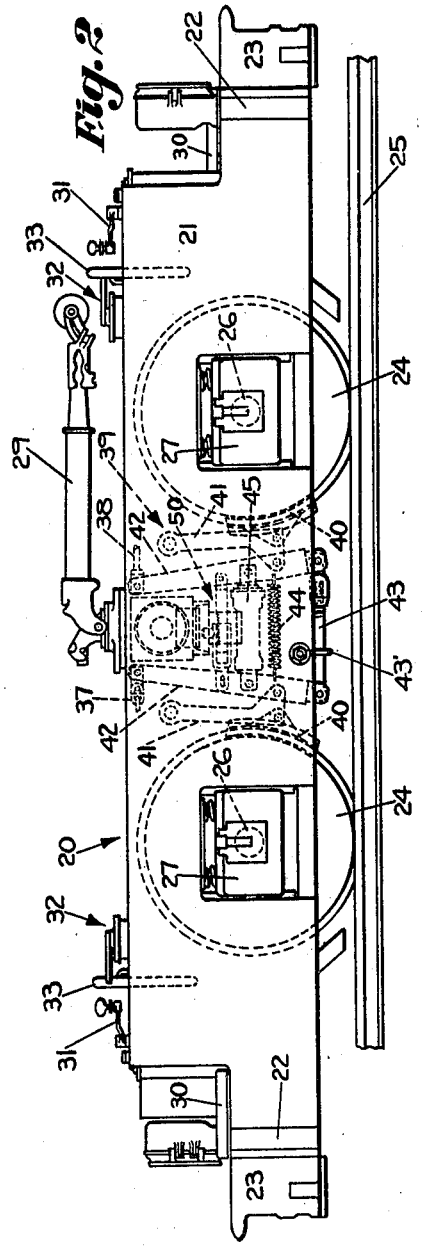
INVENTOR:
ROBERT K. JEFFREY,
BY Chas. M. Nissen,
ATTY.

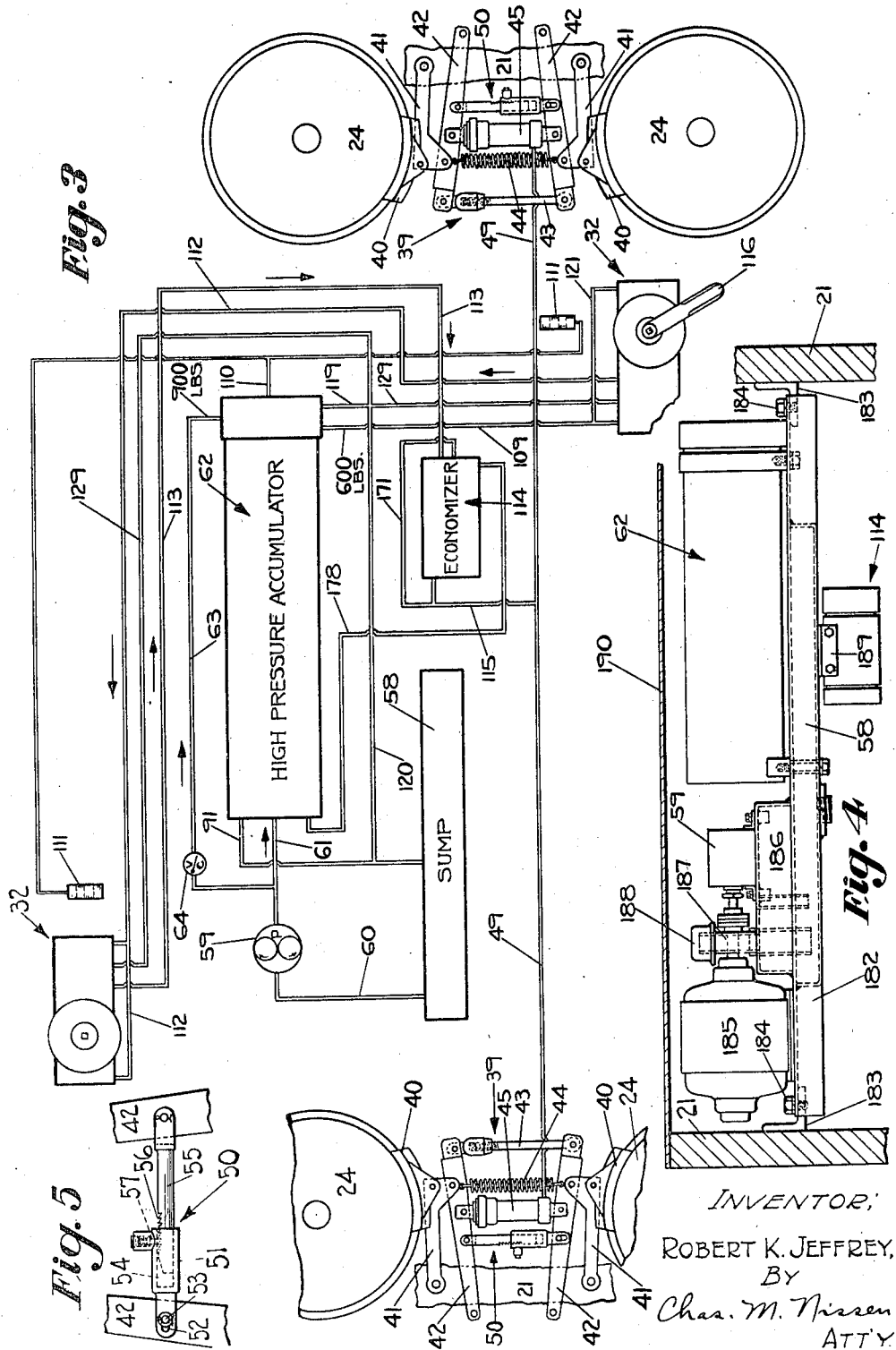

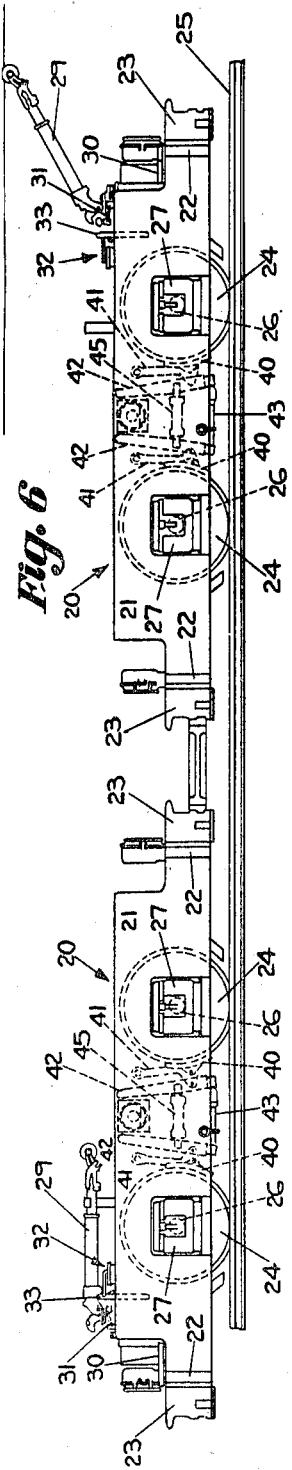

Patented Sept. 21, 1943

2,329,838

UNITED STATES PATENT OFFICE 2,329,838

BRAKING SYSTEM

Robert K. Jeffrey, Columbus, Ohio, assignor to The Jeffrey Manufacturing Company, a corporation of Ohio Original application August 4, 1939, Serial No. 288,387, now Patent No. 2,267,656, dated December 23, 1941. Divided and this application November 22, 1941, Serial No. 420,072

6 Claims. (Cl. 188—107)

This invention relates to a brake system particularly adapted for controlling heavy vehicles, such as mine locomotives.

An object of the invention is to provide a brake system which is particularly adapted to control the brakes of vehicles of the above mentioned type and to maintain the system in proper working condition after reasonable wear of the brake shoes.

Still another object of the invention is to provide an improved hydraulic braking system which combines a power operated braking system and a manually operated braking system.

Other objects of the invention will appear hereinafter, the novel features and combinations being set forth in the appended claims.

In the accompanying drawings,

Fig. 1 is a plan view of a mine locomotive including the hydraulic braking system of my invention;

Fig. 2 is a side elevational view of the mining machine of Fig. 1;

Fig. 3 is a piping diagram of the hydraulic brake system of my invention showing the operating mechanisms schematically;

Fig. 4 is an enlarged view taken on the line 4—4 of Fig. 1 looking in the direction of the arrows;

Fig. 5 is an enlarged view of the automatic brake adjusting mechanism;

Fig. 6 is a side elevational view of two mine locomotives of a train connected in tandem;

Fig. 7 is a piping diagram of the preferred hydraulic system for the locomotives in tandem, this system being similar to that shown in Fig. 3 except that the economizer is omitted; and Fig. 8 is a diagrammatic illustration of a wheel drive for the pump.

This application is a division of my application, Serial No. 288,387, filed August 4, 1939, for an improvement in a Hydraulic brake system, now Patent No. 2,267,656, dated December 23, 1941.

Referring to Figs. 1 and 2 of the drawings, there is illustrated a mine locomotive incorporating the hydraulic brake system of my invention, and while the system is susceptible to more general application as for example, in connection with trucks, tractors, or any other similar heavy equipment, it is particularly useful in combination with a mine locomotive because of the fact that these mine locomotives are quite limited in size, particularly in their height, and it is essential that the brake mechanism require a minimum of space while at the same time affording very positive and efficient action. It is also very useful with tandem locomotive units.

As seen by reference to Figs. 1 and 2 of the drawings, the mine locomotive comprises a main frame 20 formed of a pair of spaced side plates 21, 21 the ends of which are connected by cross-plates 22, 22. Each cross-plate 22 carries a combined bumper and coupler 23 which is preferably in the form of a heavy casting which is bolted to adjacent cross-plate 22.

The main frame 20 is supported upon four wheels 24 adapted to ride along rails 25 of a mine track. Wheels 24 are rigidly attached to axles 26, 26 which are journaled in spring mounted journal boxes 27, 27. The axles 26, 26 are driven by electric motors 28, 28 which derive power from a mine trolley 29.

It is to be noted that the locomotive is provided with dual controls and that it may be controlled from either end; and to this end there is a seat 30 for the operator at each end adjacent which is an electrical motor controller 31, a control valve 32 for the power operated hydraulic brake system and a hand wheel 33 for mechanically operating the braking system.

It is to be noted that each hand wheel 33 is mounted for free rotation and carries a feed screw 34 which feeds into a nut 35 carried on a laterally extending equalizer bar 36 one end of which is connected to a brake operating chain 37, the other end of which is connected to a brake operating rod 38. The chain 37 and rod 38 for the hand wheels at opposite ends of the locomotive are on reverse sides thereof, as clearly illustrated in Fig. 1 of the drawings.

On each side of the locomotive and cooperating with both wheels 24 on a single side is a braking mechanism designated generally by the reference character 39. Said braking mechanism 39 comprises brake shoes 40, 40 one associated with each of the wheels 24, each of which shoes 40 is pivotally mounted upon a bell crank lever 41 which is pivoted at its upper end to a side plate 21. Also pivotally attached to each bell crank lever 41 is an operating lever 42, said operating levers 42 being connected together at their bottoms by an adjustable connecting link 43, the opposite ends of which are pivotally attached to the bottoms of said levers 42. Also connected between the two levers 42 is a coil spring 44 which urges the tops of levers 42 towards each other about their pivotal connections to said link 43. It is evident that this coil spring 44 therefore biases the brake shoes 40 to their released or non-operating positions.

Directly above the coil spring 44 and connected between the two levers 42 is a hydraulic piston motor or jack 45, which is adapted to be expanded or contracted to apply or release the braking mechanism 39.

Directly above the hydraulic piston motor or jack 45 is an automatic brake adjusting mechanism 50 illustrated in detail in Fig. 5 of the drawings. Said automatic brake adjusting mechanism 50 comprises a generally cylindrical casting 51 which is pivotally attached to one of a pair of levers 42, 42, by a lost motion connection provided by elongated slots one of which is seen at 52 formed in the bifurcated head of the casting 51 which slots 52 cooperate with the pivot pin 53 carrying at opposite ends retaining washers and cotter keys.

Slidable within a central bore 54 in the casting 51 is a cylindrical rod 55 having a bifurcated head which is pivotally attached to the other lever 42 of the above mentioned pair. Rod 55 is provided with ratchet teeth 56 which cooperate with a spring-pressed detent 57 carried in a well in the casting 51. It is evident by reference to Fig. 5 of the drawings that the rod 55 may slide freely to the right with respect to the casting 51 with the detent 57 ratcheting over the teeth 56, but movement of said rod 55 toward the left with respect to said casting 51 is prevented.

It is evident from the structure of said brake adjusting mechanism 50 that the two levers 42 may freely move with respect to each other without any relative movement between the casting 51 and the rod 55 to the limits provided by the slots 52. However, any greater movement in an outward direction results in an expansion of the effective length of the brake adjusting mechanism 50 and this insures a relatively fixed amount of slack in the braking mechanism 39.

The upper ends of the two levers 42 are pivotally attached to the aforedescribed chains 37 and rods 38 of the manually operable brake mechanism. That is, each of the braking mechanisms 39 has a chain 37 pivotally attached to the top of one of the levers 42 which acts to accumulate slack when the brakes are released and a rod 38 pivotally attached to the top of the other member 42. Furthermore, as clearly seen by reference to Fig. 1 of the drawings, from each hand wheel 33 there is a chain 37 and a rod 38 leading to a braking mechanism 39.

It is thus evident that the brakes may be applied to the mine locomotive either by operating either of the manually controllable hand wheels 33 which provides for a purely mechanical braking mechanism operable from either end of the locomotive, or by controlling the hydraulic piston motors or jacks 45 associated with each braking mechanism 39, which also may be controlled by control valves 32 from either end of the locomotive.

Whenever a hand wheel 33 is operated to move the bar 36 rearwardly one of the levers 42 on each side of the locomotive is moved to brake applying position by swinging the top thereof with respect to the pivot provided at its bottom by the connecting link 43 which, of course, expands the link mechanism 42, 42 to apply the brakes. The link 43 rests in a hook 43' secured to the adjacent side plate 21.

Also, upon the expanding of the two hydraulic piston motors or jacks 45, which are operated together so as to apply the braking mechanism 39 on both sides of the vehicle simultaneously, the levers 42, 42 are expanded or moved away from each other about the pivots at their bottoms to apply the brake mechanisms.

When the hand wheels 33 are operated to the brake releasing positions and the hydraulic piston motors or jacks 45 are released, the coil springs 44 associated with the two braking mechanisms 39 will operate to release the braking mechanisms and swing the two levers 42 toward each other at their tops by swinging them about their pivotal axes at their bottoms.

Attention is now directed particularly to Fig. 3 of the drawings, which discloses schematically the hydraulic system for controlling the braking mechanisms 39. The hydraulic control system comprises an oil or hydraulic fluid sump or reservoir 58 from which the hydraulic fluid is derived by a pump 59 by way of pipe 60 and from which it is fed by pipe 61 to the rear end of a high pressure hydraulic fluid accumulator 62. The pipe 63 branches from the pipe 61 and leads to the head end of the accumulator 62 through a check valve 64 which allows the hydraulic fluid to flow toward said head end but prevents reverse flow thereof.

A return or drain for the system includes a pipe 91 between the low pressure end of the accumulator 62 and the sump or reservoir 58 and pipes 119, 120, 129 which drain different parts of the system connecting into said pipe 91.

A pipe 121 connecting one side of the valve 32 with the opposite side by connection with the high pressure pipe 109 is a factor in the balancing feature of said valve 32.

A pipe 171 connects the ends of the economizer to the pipe 115 which leads to the hydraulic motors or jacks 45. A pipe 178 connects the low pressure end of the accumulator 62 to the economizer 114.

The function of the accumulator 62 is twofold. In the first place it accumulates hydraulic fluid under relatively high pressure which is available for operating the hydraulic piston motors or jacks 45 of the braking mechanisms 39 even though the pump 59 has ceased to operate. In the second place it is provided with reducing valve means so that the pressure of the hydraulic fluid delivered from the accumulator is substantially constant over a large range of operation regardless of the pressure in the accumulator or the pressure delivered by the pump 59.

It may be pointed out that a pipe 110 leads to the interior of the accumulator 62 adjacent the high pressure end thereof and to pressure gauges 111, there being one adjacent each of the control valves 32 so the operator at either operating station may be apprised of the pressure of the fluid in the accumulator 62.

It may be pointed out, as shown in Fig. 3 of the drawings, that the hydraulic fluid is conducted by pipe 109 to one of the control valves 32 and thence by a pipe 112 to the other of said control valves 32 from whence it flows by pipe 113 to an economizer 114 which economizes the use of the high pressure hydraulic fluid from which economizer hydraulic fluid is delivered by way of pipe 115 to a feed pipe 49 leading to the two hydraulic piston motors or jacks 45 connected in parallel.

It may be stated that only a single operating handle 116 is provided for the two control valves 32 and it is so arranged, as hereinafter described, that said handle 116 can be removed from one control valve 32 for use on the other control valve 32 by adjusting the one control valve from which the handle is removed to the full on position, under which conditions the hydraulic fluid flows freely through the control valve 32 from which the handle 116 has been removed, without effect.

Attention is now directed particularly to Figs. 1 and 4 of the drawings, and to the physical structure of certain other elements of the hydraulic braking system. It is to be noted that the reservoir 58 is formed between the downwardly extending flanges of a transverse channel 182 which extends transversely of the locomotive along the center thereof and between the side plates 21, 21 from which it is supported by brackets 183, 183 to which the channel 182 is attached by screws 184, 184.

Mounted upon the channel 182 is an electric driving motor 185 which drives the pump 59 which is mounted upon a base 186 forming a part of the sump 58. The base 186 also is provided with an oil receiving pipe 187 having a removable breather cap 188, which pipe 187 is adapted to receive hydraulic fluid or oil to replenish that lost in the system.

Also mounted upon the channel 182 is the aforementioned accumulator 62 below which and suspended from said channel 182 by bracket means 189 is the aforementioned economizer 114. It is to be particularly noted that this mechanism requires a relatively small amount of space and the parts are compactly positioned between the side walls 21 of the mine locomotive and in addition are fully protected by the mine locomotive cover plate 190.

In the operation of the vehicle and the system disclosed in Figs. 1 to 5 of the drawings, which, as illustrated, is a mine locomotive but which may be some other type of vehicle, it is evident that the braking mechanisms 39 on the opposite sides of the vehicle associated with the wheels 24 may be operated either manually through the operating mechanisms, including hand wheels 33, or they may be operated by a power hydraulic system and either operation may be effected from either end of the vehicle.

The operation by which the brakes are manually applied by controlling the hand wheels 33 is believed obvious from the above description. Briefly described this operation includes the rotation of either hand wheel 33 to swing one of the levers 42 associated with each braking mechanism 39 rearwardly about the pivot point thereof found at its bottom which simultaneously applies all of the brake shoes 40 to the four wheels 24. Likewise, the power operated hydraulic control is provided for operating the two braking mechanisms 39 simultaneously from either end of the vehicle by controlling either one of the control valves 32 while the other is in its full on position to which it must be adjusted to permit removal of the single operating lever 116 which is employed with the two control valves 32.

Assuming that the vehicle is traveling along the rails 25 of the mine track and it is desired to apply the brakes, the operator merely moves the handle 116 from its normal drain position in a clockwise direction. The pressure applied to the hydraulic piston motors or jacks 45 is adjustable to any value between zero and the maximum available pressure in accordance with the setting of the lever 116 so that the braking action on the wheels 24 may be set at any desired value and the braking action may be maintained at this set value. Furthermore, the brakes may be readily released by returning the handle 116 to the drain position or they may be set and locked with any pressure exerted on the wheels 24.

The accumulator 62 is effective to maintain a reserve supply of hydraulic fluid under high pressure which is available even though the pump 59 has stopped and this is particularly important in connection with a mine locomotive for in case of a failure of power or in case a trolley 29 jumps off of the power line, the hydraulic brakes will not be rendered inoperative. Furthermore, in case of any accident which rendered the pump 59 inoperative there is still available a sufficient supply of hydraulic fluid under pressure to operate the brakes for a number of times, thus insuring that the vehicle can be stopped even under the most adverse conditions. It is, of course, evident that as a final precaution the mechanical brakes are always available in case the hydraulic system fails completely.

Furthermore, the economizer 114 operates automatically to take up all the slack in the brake mechanisms 39 with a minimum consumption of hydraulic fluid which is under high pressure and this conserves appreciably the hydraulic fluid under high pressure. It is, of course, evident that the economizer 114 may be omitted if this economizing feature is not desired or the ratio of operation thereof may be adjusted to any desired value depending upon the sensitivity desired and the amount of conservation of high pressure hydraulic fluid also desired.

It is thus evident that I have provided a vehicle with combined mechanical and power operated hydraulic brake operating mechanisms which are very flexible in operation, insure a high degree of safety and yet which are relatively simple in construction.

In Fig. 6 of the drawings I have illustrated an important modification of my invention in which two vehicles, which are here represented as my locomotives, are connected in tandem and are controllable by an operator on either of them to apply the brakes to both of them. The hydraulic system for this modification is illustrated in Fig. 7 of the drawings. As illustrated, each of the locomotives is provided with a single control valve 32 adjacent one end thereof. By reference, particularly, to Fig. 7 of the drawings, it is of course evident that only a single high pressure accumulator 62, pump 59 and associated mechanism of the hydraulic system is provided, all of it being situated on one of the mine locomotives as illustrated. They are situated on the mine locomotive illustrated at the right in Fig. 6 and the vertical dot and dash line of Fig. 7 indicates the division between a portion of the hydraulic system carried by the two locomotives.

In view of the above description of the hydraulic system of Fig. 3, the principal elements of the hydraulic system of Fig. 7 require no further description. However, there are certain added elements now to be pointed out.

It is of course evident that the conduits 112, 113 and 129 extend between the two vehicles. They are therefore flexible, at least in part, and are provided with coupling means so that they may be connected and disconnected to permit removal of the coupled relation of the two locomotives. Furthermore, associated with the right hand locomotive is a closure valve 240 for closing line 112, a closure valve 241 for closing line 129 and a three-way valve 242 which, in its normal position, provides the continuity of the conduit 113 between the two locomotives and which may be adjusted to connect conduits 112 and 113 by way of by-pass 243 whenever the locomotives are disconnected. In case of such disconnection, valves 240 and 241 are closed, they being normally opened when the locomotives are connected and conduits 112, 113 and 129 coupled together. It is evident that in Fig. 7 of the drawings only the brake mechanism on one side of each locomotive is illustrated, but it is of course to be understood that the brake mechanism on the other side is connected in parallel.

In the operation of the tandem vehicle arrangement of Figs. 6 and 7 it is manifest that the brakes may be applied on both vehicles while being controlled from either of them. If desired, one of the control valves 32 may be eliminated, in which case the control would be restricted to one of the vehicles. An illustration of this type of system might be where the two vehicles comprised a truck and a trailer or a truck and a series of trailers, there being hydraulic brakes on the truck and the trailer or trailers, all controllable from the operator's cab on the truck. In such a case, only the conduit 113 would have to extend between the several vehicles.

It is, of course, to be understood that the hydraulic system may be extended to more than two vehicles and the controls may be on one or more of said vehicles, it being simply necessary to continue the system by connecting the control valves 32 in a series.

In Fig. 8 of the drawings I have illustrated a further modification of the hydraulic system which is to be understood as applicable to any of the hydraulic systems indicated. I have here illustrated the pump 59 of the hydraulic system as connected to and driven from the wheels of the vehicle. This arrangement insures the presence of hydraulic fluid under pressure in case of movement of the vehicle and precludes the possibility of a dangerous situation which might arise in case the motor which drives the pump of the hydraulic system becomes inoperative. As here illustrated, the shaft 26 is directly connected to the pump 59 by way of a chain and sprocket drive mechanism 244.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In wheel brake apparatus, the combination with spaced-apart wheel brake shoes, of pivotally suspended levers for pivotally supporting said brake shoes, actuating levers pivotally connected to said levers, a link pivotally connected at its ends to the lower ends of said actuating levers, an automatically operable slack adjusting device connecting said actuating levers and operable whenever a predetermined amount of slack develops, a fluid pressure motor connecting said actuating levers entirely independently of said slack adjusting device, a brake releasing spring connecting said actuating levers, and mechanism connected to the upper end of one of said actuating levers to manually spread said actuating levers a greater distance apart to secure the application of the brake shoes to the wheels with which they are associated.

2. In wheel brake apparatus, the combination with a pair of spaced-apart wheel brake shoes, of means for pivotally supporting said brake shoes in association with the wheels of a vehicle, spaced-apart actuating levers connected to said supporting means, an extensible link pivotally connected at its ends to the lower ends of said actuating levers, a fluid pressure motor pivotally connected at its ends to said actuating levers intermediate the ends of the latter and supported thereby, automatically operated slack take-up mechanism entirely independent of said fluid pressure motor and connected at opposite ends to said actuating levers, and mechanical actuating mechanism connected to the upper end of one of said actuating levers.

3. In a braking system for vehicles, the combination with friction brake mechanism, of means for actuating said brake mechanism to apply the same, said brake applying means comprising spaced-apart pivoted actuating levers, a rigid link pivotally connected at its ends to said levers, a brake-releasing spring connecting said levers, a fluid pressure motor connecting said levers, means comprising an automatically expansible link connected at opposite ends to said actuating levers and spaced from said fluid pressure motor for taking up increased slack due to wear in the brake mechanism when the latter is applied and thereby limiting the slack in the brake mechanism to a predetermined amount when the brake mechanism is released by said spring, manually actuatable mechanism connected to one of said levers to effect the application of said brake mechanism independently of said fluid pressure motor, and means for controlling said fluid-pressure motor to effect the application of said brake mechanism by power without manual actuation of said manually actuatable mechanism.

4. The combination with a vehicle having supporting wheels, of brake shoes associated with such wheels, brake-applying mechanism connected to said brake shoes and comprising spaced pivoted levers, a rod connected to one of said levers on one side of the vehicle, a chain connected to one of said levers on the other side of the vehicle, an equalizer bar connected at its ends to said chain and said rod, a nut carried by said equalizing bar, a feed screw threaded through said nut, a journal support for said feed screw, a wheel for rotating said feed screw to secure the actuation of said rod and said chain to effect the operation of the brake-applying mechanisms on the opposite sides of the vehicle, two fluid pressure motors one connected to the brake-applying mechanism on one side of the vehicle and the other connected to the brake-applying mechanism on the other side of the vehicle, and means for controlling said fluid pressure motors.

5. The combination with a vehicle having supporting wheels, of brake shoes associated with such wheels, brake-applying mechanism connected to said shoes and comprising two pairs of spaced actuating levers one pair on one side of the vehicle and the other pair on the other side thereof, a rod connected to one lever and a chain connected to the other lever of one pair, another rod connected to one lever and another chain connected to the other lever of the other pair of levers, the rod on one side of the vehicle extending toward one end of the vehicle and the rod on the other side of the vehicle extending toward the other end of the vehicle, the chain on one side of the vehicle extending toward one end of the vehicle and the chain on the other side of the vehicle extending toward the other end of the vehicle, mechanism adjacent one end of the vehicle to exert pulls on one rod and one chain to secure the application of the brake shoes on both sides of the vehicle, and mechanism adjacent the other end of the vehicle to exert pulls on the other rod and the other chain to also secure the application of the brake shoes on both sides of the vehicle.

6. The combination with a mine locomotive having an operator's station at each end, of brake shoes associated with wheels of the locomotive on both sides thereof, brake-applying mechanisms on opposite sides of the locomotive and connected to said brake shoes, each of said brake-applying mechanisms comprising spaced levers, mechanical actuating mechanism extending from both of said operator's stations to said brake-applying mechanisms, automatic slack adjusting means connected between said levers, two fluid-pressure motors one connected between the levers on one side of the locomotive and the other connected between the levers on the other side of the locomotive, and means for controlling said fluid-pressure motors from either of said operator's stations.

ROBERT K. JEFFREY.